(12) United States Patent
Melnik et al.

(10) Patent No.: US 8,914,879 B2
(45) Date of Patent: Dec. 16, 2014

(54) SYSTEM AND METHOD FOR IMPROVING COVERAGE FOR WEB CODE

(75) Inventors: Artem Melnik, Jerusalem (IL); Mark Kaplan, Modiin (IL)

(73) Assignee: Trustwave Holdings, Inc., Chicago, IL (US)

( * ) Notice: Subject to any disclaimer, the term of this patent is extended or adjusted under 35 U.S.C. 154(b) by 228 days.

(21) Appl. No.: 13/155,179

(22) Filed: Jun. 7, 2011

(65) Prior Publication Data

US 2011/0307954 A1 Dec. 15, 2011

Related U.S. Application Data

(60) Provisional application No. 61/353,957, filed on Jun. 11, 2010.

(51) Int. Cl.
*G06F 21/00* (2013.01)
*G06F 21/55* (2013.01)
*H04L 29/06* (2006.01)

(52) U.S. Cl.
CPC .......... *G06F 21/554* (2013.01); *H04L 63/0227* (2013.01); *H04L 63/168* (2013.01)
USPC .................................. 726/22; 726/23; 726/24

(58) Field of Classification Search
CPC .. G06F 21/554; H04L 63/168; H04L 63/0227
USPC ............................................... 726/22, 23, 24
See application file for complete search history.

(56) References Cited

U.S. PATENT DOCUMENTS

| | | | |
|---|---|---|---|
| 5,448,740 A | 9/1995 | Kiri et al. | |
| 5,974,549 A | 10/1999 | Golan | |
| 6,092,194 A | 7/2000 | Touboul | |
| 6,154,844 A | 11/2000 | Touboul et al. | |
| 6,804,780 B1 | 10/2004 | Touboul | |
| 7,284,274 B1 | 10/2007 | Walls et al. | |

(Continued)

FOREIGN PATENT DOCUMENTS

| CA | 2578792 | 3/2006 |
|---|---|---|
| EP | 0965094 | 12/1999 |

(Continued)

OTHER PUBLICATIONS

AdSafe, Making JavaScript Safe for Advertising, http://www.adsafe.org, retrieved Sep. 20, 2011, 4 pgs.

(Continued)

*Primary Examiner* — Kaveh Abrishamkar
*Assistant Examiner* — Ayoub Alata
(74) *Attorney, Agent, or Firm* — Hanley, Flight and Zimmerman, LLC

(57) ABSTRACT

A system and method for improving code coverage for web code that is analyzed for security purposes by dynamic code execution are described. A controller receives information, routes the information to the appropriate engine, analyzer or module and provides the functionality for improving code coverage for code analyzed for security purposes. A code rewrite engine rewrites code in such a way that all branches and stray functions will be executed. A dynamic analyzer performs dynamic analysis on web content to detect malicious code. Additionally, a static analyzer performs static analysis on web content. The static analyzer scans web content and detects a style of coding, a style of obfuscation of the code or patterns in the code.

19 Claims, 9 Drawing Sheets

(56) References Cited

U.S. PATENT DOCUMENTS

| | | | |
|---|---|---|---|
| 7,392,541 | B2 | 6/2008 | Largman et al. |
| 7,613,926 | B2 | 11/2009 | Edery et al. |
| 7,624,449 | B1* | 11/2009 | Perriot ........................ 726/24 |
| 7,647,633 | B2 | 1/2010 | Edery et al. |
| 7,721,333 | B2 | 5/2010 | Horne |
| 7,823,201 | B1 | 10/2010 | Xu |
| 7,849,509 | B2 | 12/2010 | Venkatapathy et al. |
| 7,975,305 | B2 | 7/2011 | Rubin et al. |
| 8,074,281 | B2 | 12/2011 | Peinado et al. |
| 8,079,086 | B1 | 12/2011 | Edery et al. |
| 8,117,531 | B1 | 2/2012 | Lueck |
| 8,225,408 | B2 | 7/2012 | Rubin et al. |
| 8,407,790 | B2 | 3/2013 | Mony |
| 8,464,341 | B2 | 6/2013 | Cohen |
| 2002/0095660 | A1 | 7/2002 | O'Brien et al. |
| 2003/0023873 | A1 | 1/2003 | Ben-Itzhak |
| 2003/0065926 | A1 | 4/2003 | Schultz et al. |
| 2003/0084063 | A1 | 5/2003 | DelMonaco et al. |
| 2004/0078784 | A1 | 4/2004 | Bates et al. |
| 2005/0108554 | A1 | 5/2005 | Rubin et al. |
| 2005/0138413 | A1 | 6/2005 | Lippmann et al. |
| 2005/0193380 | A1 | 9/2005 | Vitanov et al. |
| 2005/0289358 | A1 | 12/2005 | Haselden et al. |
| 2006/0161980 | A1 | 7/2006 | Huitema et al. |
| 2006/0190606 | A1 | 8/2006 | Kohavi |
| 2007/0113282 | A1 | 5/2007 | Ross |
| 2007/0143851 | A1 | 6/2007 | Nicodemus et al. |
| 2007/0250930 | A1 | 10/2007 | Aziz et al. |
| 2007/0277163 | A1 | 11/2007 | Avresky |
| 2008/0016339 | A1 | 1/2008 | Shukla |
| 2008/0189086 | A1* | 8/2008 | Ford et al. ..................... 703/2 |
| 2008/0216175 | A1 | 9/2008 | Pike |
| 2008/0263659 | A1 | 10/2008 | Alme |
| 2008/0301796 | A1 | 12/2008 | Holostov et al. |
| 2009/0019545 | A1 | 1/2009 | Ben-Itzhak et al. |
| 2009/0031423 | A1 | 1/2009 | Liu et al. |
| 2009/0077091 | A1 | 3/2009 | Khen et al. |
| 2009/0282480 | A1* | 11/2009 | Lee et al. ..................... 726/22 |
| 2009/0328210 | A1 | 12/2009 | Khachaturov et al. |
| 2010/0115620 | A1 | 5/2010 | Alme |
| 2011/0093773 | A1 | 4/2011 | Yee |
| 2011/0179347 | A1 | 7/2011 | Proctor et al. |
| 2011/0307951 | A1 | 12/2011 | Yermakov et al. |
| 2011/0307955 | A1 | 12/2011 | Kaplan et al. |
| 2012/0117651 | A1 | 5/2012 | Edery et al. |

FOREIGN PATENT DOCUMENTS

| | | |
|---|---|---|
| EP | 1810152 | 7/2007 |
| WO | 9821683 | 5/1998 |
| WO | 9935583 | 7/1999 |
| WO | 2006025050 | 3/2006 |

OTHER PUBLICATIONS

Code Coverage Meter, http://www.coveragemeter.com/codecoverage.html, retrieved Feb. 13, 2012, 11 pgs.

Erickson, MashupOS: Can You Have Security and Web 2.0?, Dr. Dobb's Bloggers, Apr. 23, 2008, 4 pgs.

FBJS (Facebook JavaScript)—Facebook Developers, http://www.developers.facebook.com/docs/fbjs, retrieved Feb. 13, 2012, 17 pgs.

Google-caja, http://code.google.com/p/google-caja/, retrieved Sep. 20, 2011, 6 pgs.

Grune et al., Modern Compiler Design, First Edition, VU University Amsterdam, Amsterdam, The Netherlands, John Wiley & Sons, Ltd., 2000, ISBN 0471976970, 753 pgs.

Hayhurst et al., A Practical Tutorial on Modified Condition/Decision Coverage, NASA/TM-2001-210876, National Aeronautics and Space Administration, Langley Research Center, Hampton, VA, May 2001, 85 pgs.

Ho et al., Practical Taint-Based Protection using Demand Emulation, EuroSys 2006, pp. 29-41.

Howell et al., MashupOS: Operating System Abstractions for Client Mashups, 7 pgs.

International Search Report, International Application No. PCT/US2011/39869, Oct. 13, 2011, 8 pgs.

International Search Report, International Application No. PCT/US2011/39927, Sep. 29, 2011, 7 pgs.

International Search Report, International Application No. PCT/US2011/40040, Oct. 13, 2011, 16 pgs.

JavaScript The Definitive Guide, Chapter 20 JavaScript Security, 20.4 The Data-Tainting Security Model, docstore.mik.ua/orelly/web/jscript/ch20_04.html, retrieved Jan. 13, 2012, 5 pgs.

JSCoverage, Code Coverage for JavaScript, http://siliconforks.com/jscoverage/, retrieved Sep. 2, 2011, 2 pgs.

Livshits et al., Spectator: Detection and Containment of JavaScript Worms, 27 pgs.

Microsoft-Research, Gatekeeper, http://research.microsoft.com/en-us/projects/gatekeeper/, retrieved Sep. 20, 2011, 1 pg.

Microsoft-Research, Nozzle & Zozzle: JavaScript Malware Detection, http://research.microsoft.com/en-us/projects/nozzle!, retrieved Sep. 20, 2011, 2 pgs.

Microsoft WebSandbox Technology Preview, http://websandbox.livelabs.com/, retrieved Sep. 20, 2011, 6 pgs.

Nair et al., A Virtual Machine Based Information Flow Control System for Policy Enforcement, Department of Computer Science, Vrije Universiteit, Amsterdam, The Netherlands, Electronic Notes in Theoretical Computer Science 197, 2008, 14 pgs.

JavaScript Security, Chapter 14 JavaScript Security, http://devedge-temp.mozilla.org/library/manuals/2000/javascript/1.3/guide/sec.html#1021266, retrieved Sep. 20, 2011, 19 pgs.

Perlsec—perldoc.perl.org, retrieved Jan. 13, 2012, 11 pgs.

Reis et al., Usenix, BrowserShield: Vulnerability-Driven Filtering of Dynamic HTML, OSDI '06 Paper, http://www.usenix.org/events/osdi06/tech/full_papers/reis/reis_html/index.html, retrieved Sep. 20, 2011, 24 pgs.

W3C, The World Wide Web Security FAQ, CGI (Server) Scripts, www.w3.org/Security/Faq/wwwsf4.html#CGI-Q15, retrieved Jan. 13, 2012, 17 pgs.

Wang et al., The Multi-Principal OS Construction of the Gazelle Web Browser, MSR Technical Report MSR-TR-2009-16, 20 pgs.

United States Patent and Trademark Office, "Non-Final Office Action," issued in connection with U.S. Appl. No. 13/158,106, Feb. 14, 2013, 21 pages.

Patent Cooperation Treaty, "International Preliminary Report on Patentability," issued in connection with Application No. PCT/US2011/039869, Dec. 27, 2012, 5 pages.

Patent Cooperation Treaty, "International Preliminary Report on Patentability," issued in connection with Application No. PCT/US2011/040040, Dec. 27, 2012, 7 pages.

Patent Cooperation Treaty, "International Preliminary Report on Patentability," issued in connection with Application No. PCT/US2011/039927, Dec. 27, 2012, 6 pages.

"Blink Total Protection, Multi-Layered Endpoint Protection Platform", 2011, 2 pages, eEye Digital Security.

Gerad M. Davison, "Convert Dynamic to Static Construction", www.refactoring.com/catalog/convertDynamicToStaticConstruction.html, retrieved from the internet on Aug. 9, 2013, 4 pages.

United States Patent and Trademark Office, "Non-Final Office action", issued in connection with U.S. Appl. No. 13/156,952, mailed on Jan. 22, 2014, 30 pages.

United States Patent and Trademark Office, "Final Office action", issued in connection with U.S. Appl. No. 13/158,106, mailed on Nov. 29, 2013, 33 pages.

United States Patent and Trademark Office, "Non-Final Office action", issued in connection with U.S. Appl. No. 13/156,971, mailed on Mar. 18, 2014, 35 pages.

United States Patent and Trademark Office, "Notice of Allowance", issued in connection with U.S. Appl. No. 13/158,106 mailed on Apr. 3, 2014, 27 pages.

The United States Patent and Trademark Office, "Final Office action", issued in connection with U.S. Appl. No. 13/156,952, mailed on Aug. 1, 2014, 29 pages.

The United States Patent and Trademark Office, "Final Office action", issued in connection with U.S. Appl. No. 13/156,971, mailed on Oct. 22, 2014, 29 pages.

* cited by examiner

100a

402

```
a = b;

if (a > 0)
{
        a++;
}
else
{
        a--;
}
```

try{
{
        eval("a>0";a++);//evaluate the condition too but do not use the result
}
catch
{
        //restore context, or do nothing
} try{
        eval("a--");//evaluate the condition too but do not use the result
}
catch
{
        //restore context, or do nothing
}
```

Figure 4B

SYSTEM AND METHOD FOR IMPROVING COVERAGE FOR WEB CODE

CROSS-REFERENCE TO RELATED APPLICATIONS

The present application claims priority under 35 U.S.C. §119(e) to U.S. Provisional Patent Application No. 61/353,957, filed on Jun. 11, 2010, entitled "Method and System for Detecting Malicious Content" which is herein incorporated by reference in its entirety.

BACKGROUND

This invention generally relates to malicious software detection. More particularly, the invention relates to improving code coverage for web content and code that is analyzed for security purposes by dynamic code execution.

A typical web page for viewing by a browser is no longer a simple static "hypertext page." Instead the web page is for engaging dynamic functionality of the browser. The dynamic functionality of the browser allows for interactive and animated web sites. Additionally, the dynamic functionality of the browser opens numerous possibilities of malicious code to exploit the browser and other applications at runtime.

Network security content scanners are inherently limited in their ability to find malicious code. For example, when running code through a dynamic analyzer or code execution box, some portions of the code potentially go unchecked. This could be the result of different environmental settings, of missing code (e.g. a function is declared but it is only called by an external file that was not yet fetched), or a direct result of hackers trying to fool the dynamic analyzer while retaining the ability of the code to run in a normal browser. The browser executes the unchecked portions of the code resulting in exploitation of the browser and other applications during runtime.

Therefore, what is needed are a method and system for improving code coverage for web code that is analyzed for security purposes by dynamic code execution.

SUMMARY OF THE INVENTION

Embodiments of the present invention provide a system and method for improving code coverage for web code that is analyzed for security purposes by dynamic code execution. In one embodiment, a code analyzer includes a controller, a parameter retrieval engine, a scan engine, a code rewrite engine, a dynamic analyzer, a static analyzer, a statistics module and graphical user interface engine. The controller receives information and routes the information to the appropriate engine, analyzer or module and improves code coverage for code analyzed for security purposes. The code rewrite engine rewrites code in such a way that all branches and stray functions will be executed. The dynamic analyzer runs dynamic analysis on the web content to detect malicious code.

In one embodiment, a code analyzer receives a request from a user device requesting data or seeking communication with a web server. The code analyzer then receives a response including web content associated with the request from the web server. A scan engine performs a scan on the web content to locate conditional statements in dynamic code portions of the web content. A code rewrite engine rewrites the code for executing branches and stray functions. A dynamic analyzer performs dynamic analysis on the rewritten code for detecting malicious code.

In one embodiment, a controller transmits web content to the dynamic analyzer for making a first pass scan of the code in the web content. The dynamic analyzer detects in the code a querying of a value of an environmental parameter during the first pass. The dynamic analyzer queues a second pass scan with a different value of the environmental parameter. After the first pass scan finishes, the dynamic analyzer runs the second pass scan with the different value for the environmental parameter to detect malicious code.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 4a is an example of code before it is rewritten.

FIG. 4b is an example of code after it is rewritten according to an embodiment of the invention.

DETAILED DESCRIPTION OF THE PREFERRED EMBODIMENTS

Figure 1A:
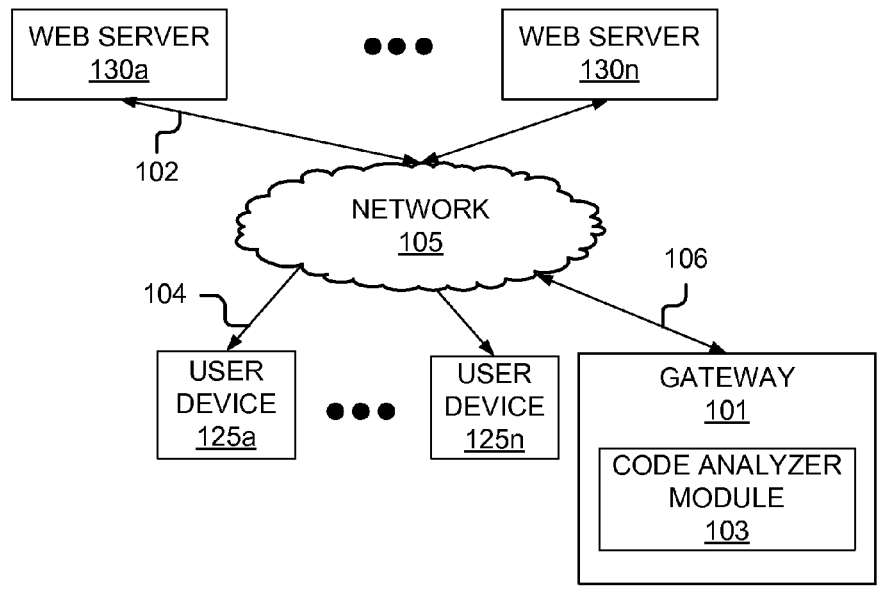
FIG. 1a is a block diagram of a system for improving code coverage for web content and code according to a first embodiment of the invention.

A method and system for improving code coverage for web content and code analyzed for security purposes by dynamic code execution is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1a illustrates a block diagram of a system 100a for improving code coverage for web content and code according to an embodiment of the invention. The system 100a for improving code coverage includes one or more user devices 125a-n, gateway 101 and one or more web servers 130a-n. In the embodiment shown by FIG. 1a, these entities are communicatively coupled via a network 105.

The user devices 125a-n in FIG. 1a are used by way of example. User devices 125a-n are computing devices having data processing and communication capabilities. For example, user device 125a comprises a desktop computer, a laptop computer, a netbook computer, a tablet computer, a smartphone or an internet capable television. Also, user device 125a is coupled to network 105 via signal line 104. While FIG. 1 illustrates two user devices, the specification applies to any system architecture having any number of user devices 125n. Furthermore, while only one network 105 is coupled to the user devices 125a-n, gateway 101 and web servers 130a-n, in practice any number of networks 105 can be connected to the entities. User devices 125a-n execute instructions or data using a processor to store, retrieve, modify or otherwise access data. When executing one or more processes, the client devices 125a-n access data, such as web content, from a remote source, such as web servers 130a-n. To access remote data, the user devices 125a-n send a request for web content to web servers 130a-n.

Web servers 130a-n are computing devices having data processing and communication capabilities. Web server 130a is coupled to network 105 via signal line 102. Web servers 130a-n receive requests from user devices 125a-n for web content and transmit responses including web content to the user devices 125a-n. Web content includes text, executable scripts and web objects. Web objects include images, sounds, multimedia presentations, video clips and also active code that run on user devices 125a-n. Executable scripts and active code components are a security concern, since they may include malicious code that harms user devices 125a-n.

In FIG. 1a, gateway 101 is a computing device that couples user devices 125a-n and the network 105. For example, the gateway 101 is a router, a wireless access point, a network switch or any other suitable type of computing device. Gateway 101 is coupled to network 105 via signal line 106. Gateway 101 intervenes between requests, from user devices 125a-n for web content and responses originating from web servers 130a-n. Gateway 101 includes a code analyzer 103 for analyzing incoming web content in order to detect the presence of malicious executable scripts or active code. Gateway 101 analyzes incoming web content from web servers 130a-n and determines whether the web content executes malicious code. While FIG. 1a shows the gateway 101 as a separate component, in some embodiments the gateway 101 is included in the user devices 125a-n.

The network 105 is a conventional network and may have any number of configurations such as a star configuration, a token ring configuration or another configuration known to those skilled in the art. In various embodiments, the network 105 is a wireless network, a wired network or a combination of a wireless and a wired network. Furthermore, the network 105 may be a local area network (LAN), a wide area network (WAN) (e.g., the Internet) and/or any other interconnected data path across which multiple devices may communicate. In yet another embodiment, the network 105 may be a peer-to-peer network.

The network 105 may also be coupled to, or include, portions of a telecommunications network for communicating data using a variety of different communication protocols. In yet another embodiment, the network 105 includes a Bluetooth communication network and/or a cellular communications network for sending and receiving data. For example, the network 105 transmits and/or receives data using one or more communication protocols such as short messaging service (SMS), multimedia messaging service (MMS), hypertext transfer protocol (HTTP), direct data connection, WAP, email or another suitable communication protocol.

Figure 1B:
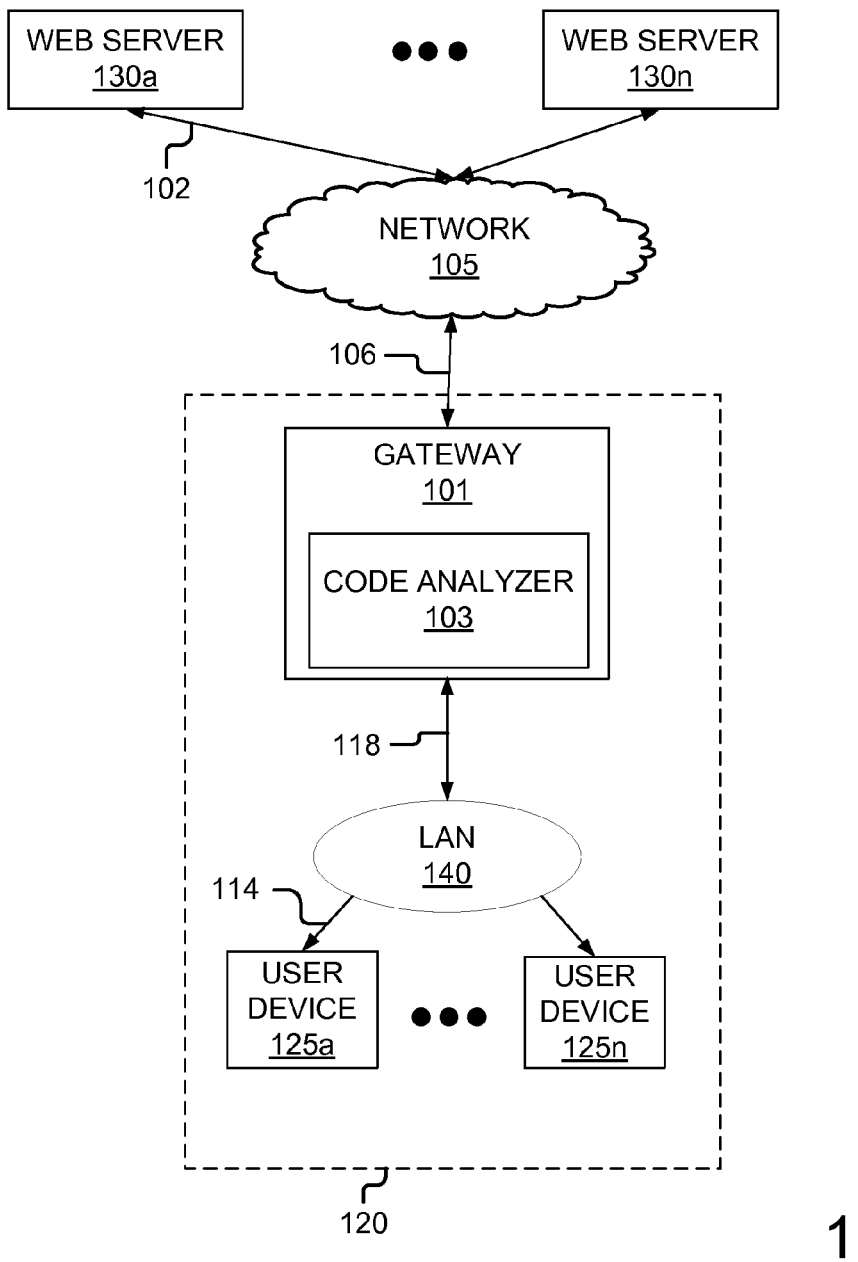
FIG. 1b is a block diagram of a system for improving code coverage for web content and code according to a second embodiment of the invention.

FIG. 1b illustrates a block diagram of an alternate system 100b for improving code coverage for web content and code according to another embodiment of the invention. The system 100b includes one or more web servers 130a-n coupled to network 105. The network 105 communicates data between web servers 130a-n and an enterprise system 120. In one embodiment, the enterprise system 120 includes the gateway 101, a Local Area Network (LAN) 140 and one or more user devices 125a-n. In the embodiment, data such as web requests and web content are transmitted between the gateway 101 and the user devices 125a-n via LAN 140. LAN 140 uses wireless, wired or a combination of wireless and wired communication techniques, as described above with respect to the network 105, to communicate data between the gateway 101 and user devices 125a-n. The gateway 101 is coupled to LAN 140 via signal line 118 and user device 125a is coupled to LAN 140 via signal line 114.

Code Analyzer 103

Figure 2:
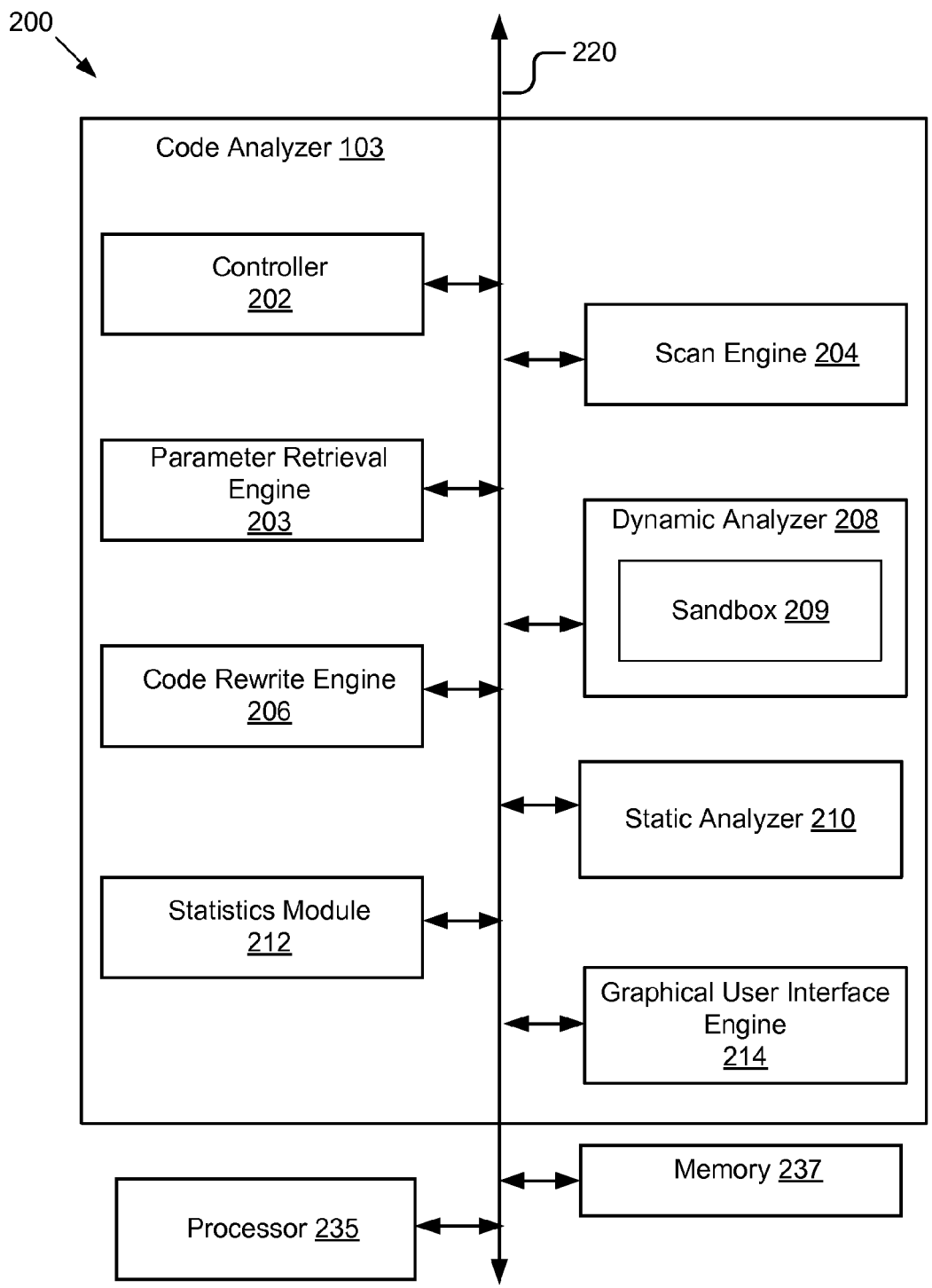
FIG. 2 is a block diagram of a code analyzer for improving code coverage for web content and code according to an embodiment of the invention.

FIG. 2 illustrates the code analyzer 103 in more detail. FIG. 2 is a block diagram of a computing device 200 that includes the code analyzer 103, a processor 235, a bus 220 and memory 237. The code analyzer 103, the processor 235 and the memory 237 communicate with each other via bus 220. In another embodiment, the computing device 200 is a user device 125a.

The processor 235 comprises an arithmetic logic unit, a microprocessor, a general purpose controller or some other processor array to perform computations and provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the code analyzer 103 comprises a controller 202, a parameter retrieval engine 203, a scan engine 204, a code rewrite engine 206, a dynamic analyzer 208, a static analyzer 210, a statistics module 212 and graphical user interface engine 214 that all communicate with each other via the bus 220.

The controller 202 is software including routines for receiving information and routing the information to the appropriate engine, analyzer or module. In one embodiment, the controller 202 is a set of instructions executable by processor 235 to provide the functionality described below for improving code coverage for code analyzed for security purposes. In another embodiment, the controller 202 is stored in the memory 237 of computing device 200 and is accessible and executable by processor 235. In either embodiment, the controller 202 is adapted for cooperation and communication with the processor 235, the memory 237, the parameter retrieval engine 203, the scan engine 204, the code rewrite engine 206, the dynamic analyzer 208, the static analyzer 210, the statistics module 212 and graphical user interface engine 214 via the bus 220.

In one embodiment, the controller 202 receives a request from a user device 125a for web content provided by a web server 130a. The controller 202 transmits the request to web server 130a. Web server 130a receives the request and responds by sending a response including the web content to controller 202. The controller 202 receives the response and initiates a process for analyzing the web content for malicious code before sending the response to user device 125a. If the controller 202 receives a determination that malicious code related to the web content was detected, the controller 202 performs an action to prevent the malicious code from running on the user device 125a and notifies the user device 125a via the network 105. In one embodiment, the action includes quarantining the response or modifying the malicious code. If the controller 202 receives a determination that the code is not malicious, the controller 202 allows the user device 125a to receive the content.

The parameter retrieval engine 203 is software including routines for determining a set of parameters for analyzing web content using multiple passes. In one embodiment, parameters include environmental parameters such as user-agent strings. In one embodiment, the parameter retrieval engine 203 selects a set of user-agents strings from memory 237.

The scan engine 204 is software including routines for examining the web content. In one embodiment, scan engine 204 detects and extracts dynamic portions of code in the web content. In another embodiment, scan engine 204 examines the web content for queries of environmental parameter and branches based on a value of the environmental parameters. In another embodiment, the scan engine 204 examines the web content for references to external resources such as script files, Cascading Style Sheets (CSS) files, HTML part files, etc. Additionally, the scan engine 204 retrieves the external resources that are referenced in the web content.

The dynamic analyzer 208 is software including routines for running dynamic analysis on the web content to detect malicious code. Dynamic analysis is analysis performed on executing programs. In one embodiment, the dynamic analyzer 208 includes a code execution sandbox 209 that executes dynamic portions of code. The sandbox 209 executes code in an environment that emulates a browser of user device 125a and features of the browser. The environment emulates browser-specific features such as dynamic HTML functionality and frameworks that support rich internet applications (RIA). Examples of dynamic HTML functionality include JavaScript, VBScript, AJAX, JSON, XML-to-HTML data binding and CSS. Examples of frameworks that support RIA include Adobe Flash, AIR, MS Silverlight, Novell Moonlight, Adobe PDF and Sun JavaFX.

The static analyzer 210 is software including routines for performing static analysis on the web content. Static analysis is analysis of code that does not execute the program. Specifically, the static analyzer 210 performs static analysis on the web content without actually executing the code in the web content. The static analyzer 210 analyzes individual statements and declarations for locating potential vulnerabilities in the code. The static analyzer 210 analyzes web content and evaluates a style of coding, a style of obfuscation of the code or patterns in the code.

The code rewrite engine 206 is software including routines for rewriting code in such a way that all branches and stray functions will be executed. In one embodiment, the code rewrite engine 206 rewrites code by creating a version of the code without conditional statements. In another embodiment, the code is rewritten by creating a version of the code that evaluates the conditional statements but does not use the result of the conditional statements. In another embodiment, the code rewrite engine 206 rewrites code by adding special markers in conditional scopes and in functions. The specials markers indicate that the marked sections were not analyzed during dynamic analysis.

The statistics module 212 is software including routines for gathering statistics about code coverage during analysis of code rewritten with the special markers. The statistics module 212 determines statistics about actual coverage upon completion of dynamic analysis. In one embodiment, the statistics module 212 determines special markers that were triggered and special markers that were not triggered during dynamic analysis. Special markers that were not triggered points to conditional scopes or functions that were not analyzed during dynamic analysis.

The graphical user interface engine 214 is software including routines for generating a user interface for a user. In one embodiment, the graphical user interface engine 214 generates a user interface for displaying statistics about code coverage upon completion of analysis of code. In another embodiment, the graphical user interface engine 214 alerts the user of a detection of malicious code from analysis of the code. In another embodiment, the graphical user interface engine 214 alerts the user that an analysis found no malicious code. In another embodiment, the graphical user interface engine 214 generates a user interface for displaying one or more options for handling detected malicious code. In another embodiment, the graphical user interface engine 214 receives a selected option from a user for handling detected malicious code.

Methods

Figure 3:
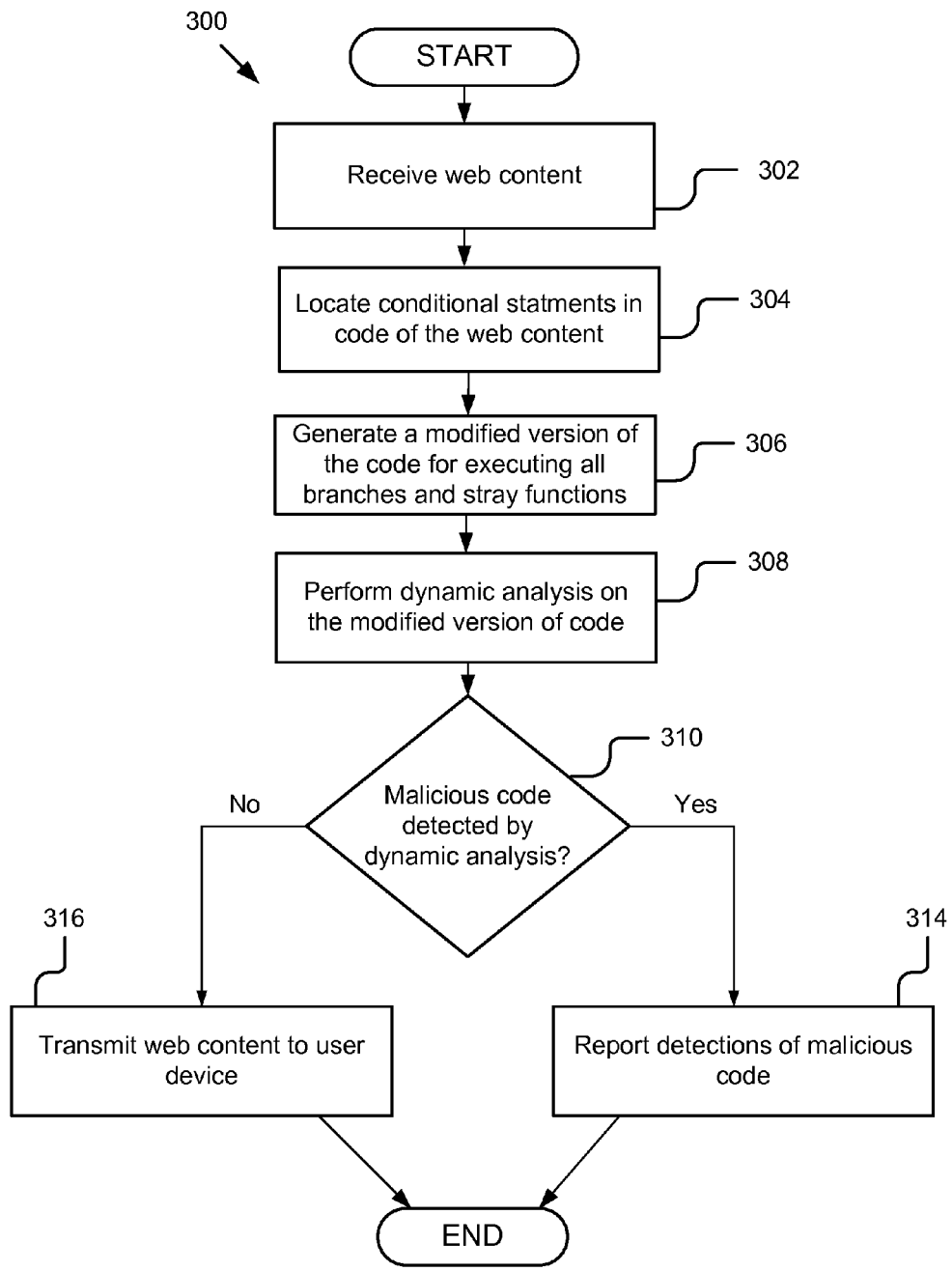
FIG. 3 is a flow diagram of a method for improving code coverage with code rewrite according to an embodiment of the invention.

Referring now to FIGS. 3-7, various embodiments of the methods of the specification will be described. FIG. 3 is a flow diagram 300 for improving code coverage with code rewritten by a code analyzer 103 according to an embodiment of the invention. The code analyzer 103 receives a request from a user device 125a requesting data or seeking communication with a web server 130a. For example, the code analyzer 103 receives a hypertext transfer protocol (HTTP) request that requests web content served by web server 130a. In one embodiment, the code analyzer 103 included in the gateway 101 or user device 125a then receives 302 web content from the web server 130a associated with the request. For example, the code analyzer 103 receives an HTTP response from the web server 130a to the request.

The controller 202 transmits the web content to the scan engine 204. The scan engine 204 performs a scan on the web content to locate 304 conditional statements in dynamic code portions of the web content. For example, the scan engine 204 identifies and locates "if-then-else" constructs in the code. The code rewrite engine 206 generates 306 a modified version of the code for executing all branches and stray functions.

FIGS. 4a and 4b illustrate an example of generating a modified version of the code by rewriting a conditional statement in a form that executes all branches related to the conditional statement unconditionally. In FIG. 4a, original code 402 includes an "if-then-else" construct. The code rewrite engine 206 rewrites 306 original code 402 in the form of the rewritten code 404 illustrated in FIG. 4b. The code rewrite engine 206 identifies each branch in the construct, removes the "if-then-else" construct and moves each branch into a context-recovery block, such as a "try-catch" block. In FIG. 4b, both the "then" branch and "else" branch are moved into "try-catch" blocks. In one embodiment, the code rewrite engine 206 moves the condition "a>0" into at least one of context-recovery blocks for evaluation purposes. In another embodiment, the code rewrite engine 206 removes the condition "a>0" from the code.

Referring back to FIG. 3, the controller 202 transmits the modified version of the code to the dynamic analyzer 208. The dynamic analyzer 208 performs 308 dynamic analysis on the modified version of code and determines 310 whether malicious code was detected by dynamic analysis. If the dynamic analyzer 208 does not detect malicious code in the web content, the controller 202 transmits 312 the web content without rewritten code to the user device 125a. If the dynamic analyzer 208 detects malicious code, the controller 202 instructs the graphical user interface engine 214 to report 314 detections of malicious code by creating a user interface for displaying a report related to the malicious code. In one embodiment, the user interface is displayed at the user device 125a. In another embodiment, the user interface is displayed at the gateway 101 to a system administrator. In one embodiment, the user interface displays options for remediation of the detected malicious code that include quarantining the malicious code, repairing the malicious code and disabling the malicious code.

Figure 5:
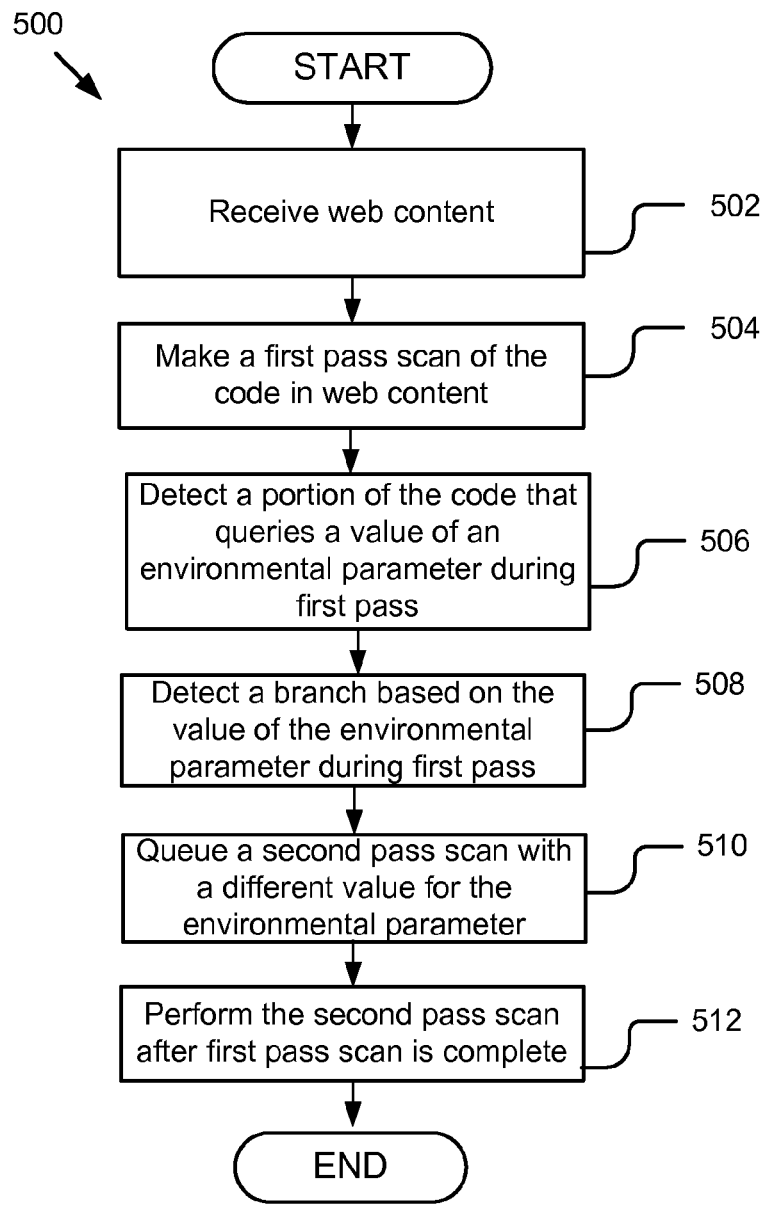
FIG. 5 is a flow diagram of a method for improving code coverage by gathering statistics of code coverage according to an embodiment of the invention.

FIG. 5 is a flow diagram 500 of a method for improving code coverage with multiple passes and multiple environmental parameters according to an embodiment of the invention. The code analyzer 103 receives 502 web content for dynamic analysis. In one embodiment, the code analyzer 103 receives 502 a response to a request for web content from web server 130a. For example, the code analyzer 103 receives 502 an HTTP response from the web server 130a. The HTTP response includes the web content.

The controller 202 transmits the web content to the dynamic analyzer 208 for making 504 a first pass scan of the code in the web content. The dynamic analyzer 208 detects 506 a portion of the code that queries a value of an environmental parameter during the first pass. In one embodiment, the values for the environmental parameter are user-agent strings. User-agent strings include details about a browser, such as type and version, and a system, such as operating system and version. The dynamic analyzer 208 also detects 508 a branch based on the value of the environmental parameter during the first pass. The dynamic analyzer 208 queues 510 a second pass scan with a different value for the environmental parameter. In one embodiment, a queue for the second pass is stored in memory 237. In one embodiment, the dynamic analyzer 208 selects the different value from a set of environmental parameters received from the parameter retrieval engine 203. Finally, after the first pass scan finishes, the dynamic analyzer 208 performs 512 the second pass scan with the different value for the environmental parameter to detect malicious code.

Figure 6:
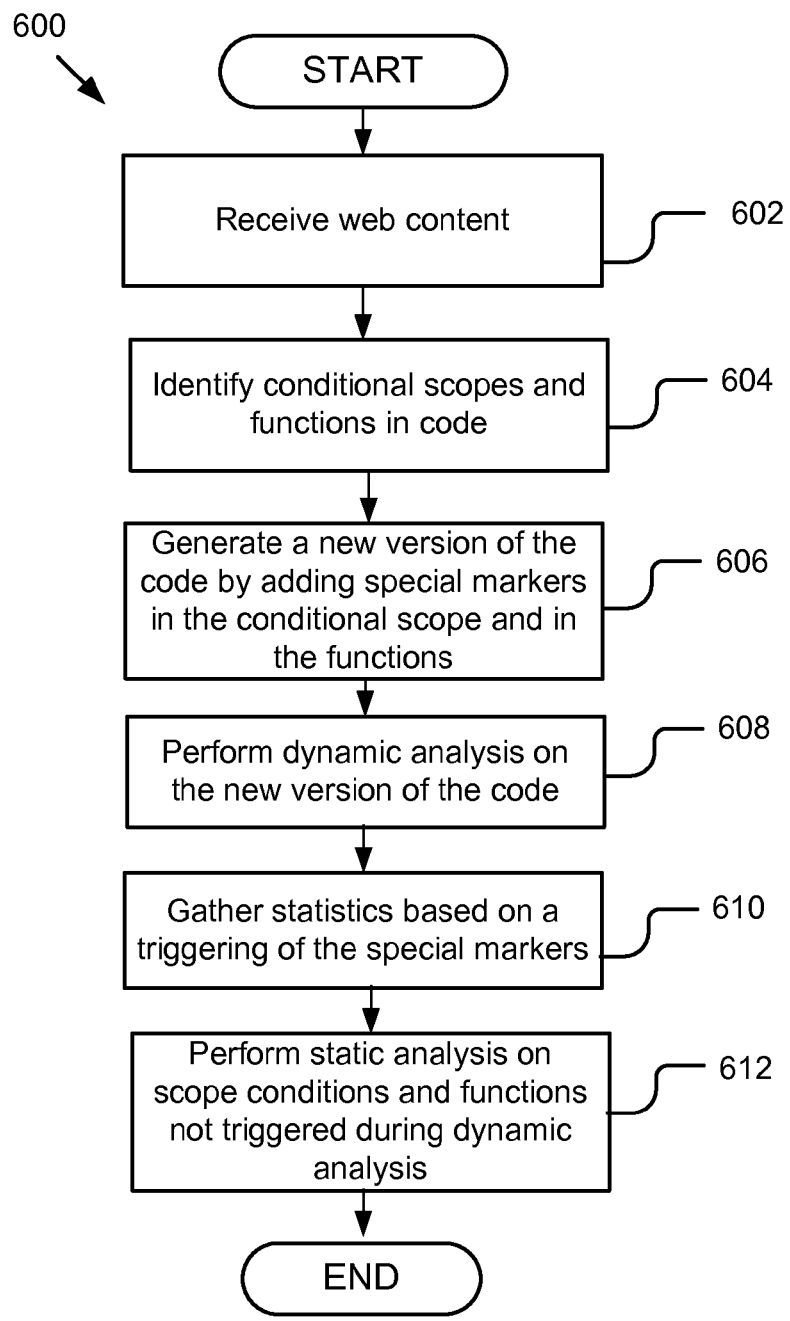
FIG. 6 is a flow diagram of a method for improving code coverage by combining dynamic analysis and static analysis according to an embodiment of the invention.

FIG. 6 is a flow diagram 500 of a method for improving code coverage by gathering statistics of code coverage according to an embodiment of the invention. The code analyzer 103 receives 602 web content for dynamic analysis. In one embodiment, the code analyzer 103 receives 602 a response to a request for web content from web server 130a. For example, the code analyzer 103 receives 602 an HTTP response from the web server 130a. The HTTP response includes the web content.

The controller 202 transmits the web content to the scan engine 204. The scan engine 204 performs a scan on the web content to identify 604 conditional scopes and functions in dynamic code portions of the web content. In one embodiment, all of the conditional statements are located in the code of the web content. The code rewrite engine 206 generates 606 a new version of the code by adding special markers in the conditional scopes and in the functions. The special markers indicate the locations of conditional scopes or functions that were not dynamically analyzed. In one embodiment, the special markers are added to each branch related to each conditional statement.

The controller 202 transmits the new version of the code to the dynamic analyzer 208. The dynamic analyzer 208 performs 608 dynamic analysis on the new version of the code. The statistics module 212 gathers 610 statistics of code coverage based on the special markers that were added to the code. In one embodiment, the controller 202 instructs the graphical user interface engine 214 to generate a user interface for displaying statistics of the code coverage gathered by the statistics module 212. Because the special markers point to conditional scopes or functions that were not analyzed, the static analyzer 210 performs 612 static analysis on the scope conditions and functions that were not triggered during dynamic analysis.

Figure 7:
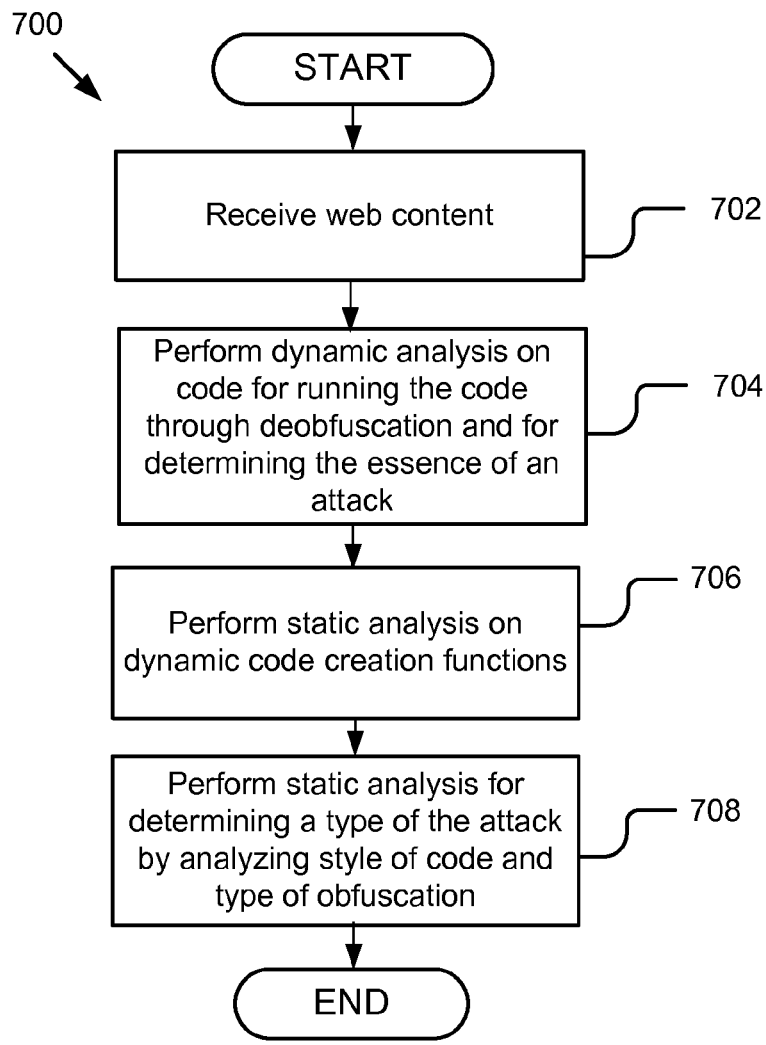
FIG. 7 is a flow diagram of a method for determining whether to use dynamic analysis or static analysis according to an embodiment of the invention.

FIG. 7 is a flow diagram 700 of a method for improving code coverage by combining dynamic analysis and static analysis according to an embodiment of the invention. The code analyzer 103 receives 702 web content for analysis. In one embodiment, the code analyzer 103 receives 702 a response to a request for web content from web server 130a. For example, the code analyzer 103 receives an HTTP response from the web server 130a. The HTTP response includes the web content.

The controller 202 transmits the web content to the dynamic analyzer 208. The dynamic analyzer 208 performs 704 dynamic analysis on the code in the web content for deobfuscating the code and determining the essence of an attack. Obfuscated code is used to hide malicious code in the web content. Additionally, the static analyzer 210 performs 706 static analysis on dynamic code creation functions that are generated during dynamic analysis. The static analyzer 210 also performs 708 static analysis for determining a type of the attack by analyzing a style of code and a type of obfuscation. In one embodiment, dynamic analysis and static analysis are performed independently. In other embodiment, static analysis runs on code scopes that were not analyzed during the dynamic analysis. In another embodiment, static analysis runs before dynamic analysis. In another embodiment, dynamic analysis runs before static analysis.

Figure 8:
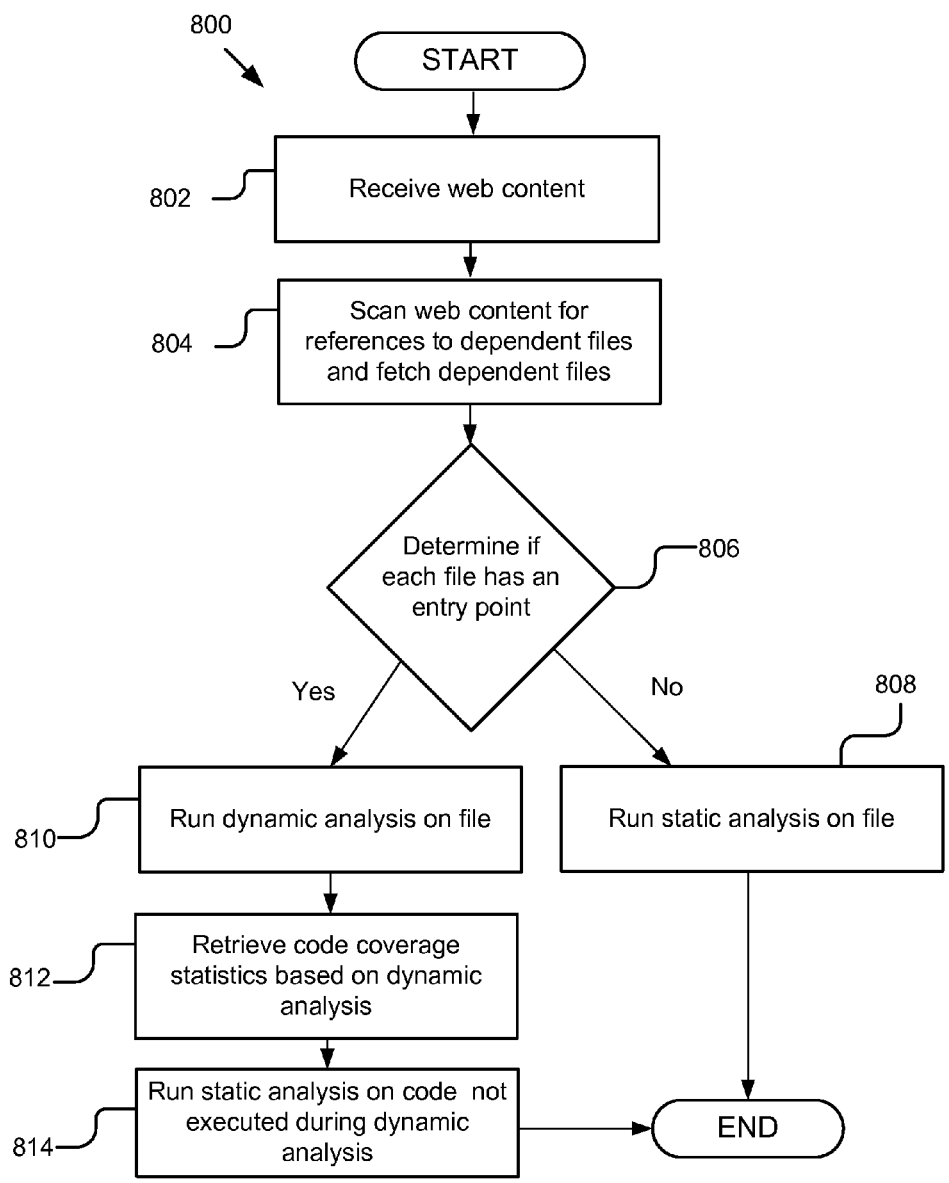
FIG. 8 is a flowchart illustrating an example of rewriting a conditional statement to execute all branches.

FIG. 8 is a flow diagram 800 of a method for determining whether to perform dynamic analysis or static analysis on a file related to web content according to an embodiment of the invention. The code analyzer 103 receives 802 web content. In one embodiment, the code analyzer 103 receives a response to a request for web content from web server 130a. For example, the code analyzer 103 receives an HTTP response from the web server 130a. The HTTP response includes the web content.

The controller 202 transmits the web content to the scan engine 204. The scan engine 204 scans 804 the web content for references to dependent files, for example, external JavaScript files, and fetches the dependent files.

The controller 202 determines 806 if a dependent file has an entry point. If the controller 202 determines that the file has no entry point, only static analysis is possible and the controller 202 transmits the file to the static analyzer 210 to run 808 static analysis on the file. If the controller 202 determines that the file does have at least one entry point, the controller 202 transmits the file to the dynamic analyzer 208 to run 810 dynamic analysis on the file. The statistics module 212 retrieves 812 code coverage statistics based on the dynamic analysis. Then, static analyzer 210 runs 814 static analysis on code that was not executed during dynamic analysis.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method, the method comprising:
    locating conditional statements in the web code received in web content;
    identifying an if-then-else construct in a first conditional statement of the conditional statements;
    rewriting the first conditional statement into a corresponding first unconditional statement by rewriting a then-block of the if-then-else construct into a first context-recovery block and rewriting an else-block of the if-then-else construct into a second context-recovery block to generate a modified version of the web code; and
    performing dynamic analysis on the modified version of the web code by executing the first unconditional statement to analyze a corresponding branch of the first conditional statement to detect malicious code in the web code.

2. The computer-implemented method of claim 1, futher comprising adding markers to each branch of the conditional statements.

3. The computer-implemented method of claim 2, further comprising gathering statistics related to code coverage based on a triggering of the markers in the dynamic analysis.

4. The computer-implemented method of claim 2, further comprising performing static analysis on each branch not executed in the dynamic analysis.

5. The computer-implemented method of claim 1, wherein performing the dynamic analysis includes deobfuscating the web code to identify the malicious code.

6. The computer-implemented method of claim 5, further comprising performing static analysis on dynamically created code generated during the dynamic analysis.

7. The computer-implemented method of claim 1, further comprising:
    detecting a query of a value of an environment parameter during a first pass scan; and
    detecting a branch based on the value of the environmental parameter.

8. The computer-implemented method of claim 7, further comprising:
    queuing a second pass scan with a different value for the environmental parameter; and
    making the second pass scan after completion of the first pass scan.

9. The computer-implemented method of claim 1, further comprising remediating the malicious code.

10. A system comprising:
    a scan engine to locate conditional statements in web code received in web content and to identify a first conditional statement in the conditional statements in the web code by identifying a corresponding if-then-else construct in the web code;
    a code rewrite engine to generate a modified version of the web code by rewriting the first conditional statement into a corresponding first unconditional statement by rewriting a then-block of the if-then-else construct into a first context-recovery block and rewriting an else-block of the if-then else construct into a second context-recovery block; and
    a dynamic analyzer to perform dynamic analysis on the modified vesion of the web code by executing the first unconditional statement to analyze a respective branch of the first conditional statement to detect malicious code in the web code.

11. The system of claim 10, wherein the code analyzer is further to generate the modified version of the web code by adding markers to each branch related to the conditional statements.

12. The system of claim 11, further comprising a statistics module to gather statistics related to code coverage based on a triggering of the markers in the dynamic analysis.

13. The system of claim 10, further comprising a static analyzer to perform static analysis on a branch not executed in the dynamic analysis.

14. A tangible computer readable storage disc or storage device comprising instructions that, when executed, cause a machine to at least:
    locate a conditional statements in the web code received in web content;
    identify an if-then-else construct in a first conditional statement of the conditional statement;
    rewrite (1) a then-block of the if-then-else construct into a first context-recovery block and (2) an else-block of the if-then else construct into a second context-recovery block to generate a modified version of the web code; and
    perform dynamic analysis on the modified version of the web code by executing the first unconditional statement to analyze a corresponding branch of the first conditional statement to detect malicious code in the web code.

15. The tangible computer readable storage disc or storage device of claim 14, wherein the instructions cause the machine to perform the dynamic analysis by detecting a query of a value of an environmental parameter during a first pass scan; and detecting a branch based on the value of the environmental parameter.

16. The tangible computer readable storage disc or storage device of claim 15, wherein the instructions further cause the machine to:
    queue a second pass scan with a different value for the environmental parameter; and
    make the second pass scan after completion of the first pass scan.

17. The method according to claim 1, further comprising:
    executing the first unconditional statement by performing a first try-catch routine on the first context-recovery block to detect malicious code in the first context-recovery block;

performing a second try-catch routine on the second context-recovery block to detect malicious code in the second context-recovery block; and reporting that malicious code is present in the web code via a user interface when malicious code is detected in at least one of the first context-recovery block or the second context-recovery block.

18. The system according to claim 10, wherein the dynamic analyzer is to:

perform a first try-catch routine on the first context-recovery block to detect malicious code in the first context-recovery block;

perform a second try-catch routine on the second context-recovery block to detect malicious code in the second context-recovery block; and report that malicious code is present in the web code via a user interface when malicious code is detected in at least one of the first context-recovery block or the second context-recovery block.

19. The tangible computer readable storage disc or storage device according to claim 14, wherein the instructions, when executed, cause the machine to:

perform a first try-catch routine on the first context-recovery block to detect malicious code in the first context-recovery block;

perform a second try-catch routine on the second context-recovery block to detect malicious code in the second context-recovery block; and report that malicious code is present in the web code via a user interface when malicious code is detected in at least one of the first context-recovery block or the second context-recovery block.

* * * * *